United States Patent Office 3,741,934
Patented June 26, 1973

3,741,934
METHOD FOR HARDENING AN EPOXY HAVING AT LEAST TWO 1,2-EPOXY GROUPS
Adolf Heslinga, Pijnacker, and Petrus Jan Napjus, Delft, Netherlands, assignors to Nederlandse Organisatie voor Toegepast-Natuurwetenschappelijk Onderzoek ten behoeve van Nijverheid, Handel en Verkeer, The Hague, Netherlands
Filed Mar. 26, 1971, Ser. No. 128,269
Claims priority, application Netherlands, Apr. 4, 1970, 7005967
Int. Cl. C08g 30/10
U.S. Cl. 260—47 EC   12 Claims

ABSTRACT OF THE DISCLOSURE

Epoxy resins are hardened with primary, secondary or tertiary amines, with organic acid anhydrides or with phenols. A catalyst may be used.

According to the invention a polyfunctional epoxy resin i.e. an epoxy resin with on the average at least two epoxy groups per molecule is hardened by reacting it with an α-halogenalkyl ether that on the average has at least two α-halogenalkyl ether groups in the molecule.

Figure 1:
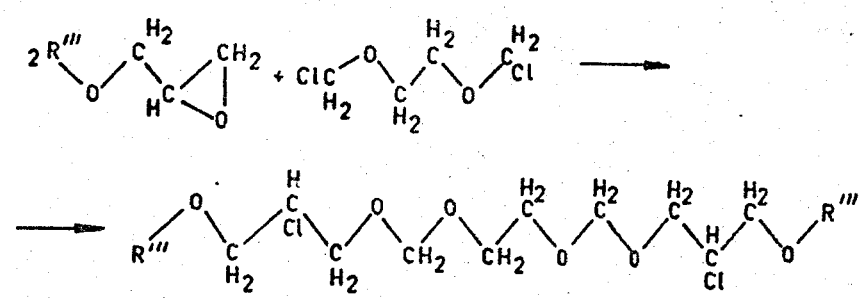

In FIG. 1 the reaction of an α-chloroalkyl ether in which alkyl is methyl and in which two α-chloromethyl groups are present in the molecule with an epoxy compound is depicted but for reasons of clearness the epoxy compound shown has only one epoxy groups. According to the invention two such groups must at least be present. R''' is a phenyl group. Catalysts may be used in the hardening process according to the invention.

---

The method relates to the polymerization and hardening of epoxy resins, more in particular to a new type of hardener for difunctional and/or polyfunctional epoxy resins.

The technology of epoxy resins is, for instance, described in a publication "Epoxy-Resin technology" by Interscience Publishers (John Wiley & Sons) (1968).

Epoxy resins are known in the art for their chemical resistance, low shrinkage, excellent adhesive power to several types of material, heat-resistance, very good electrical properties and easy manipulation. These many applications are realized because after the addition of certain additives, so-called hardeners, they can condensate from liquids or fusible solids into permanently infusible and insoluble products (cross-linking).

Hardeners known in the art are i.a. aliphatic and aromatic primary, secondary and tertiary amines, acid anhydrides and phenols. These reactions may be influenced catalytically, too.

Epoxy resins known in the art, which are much used are reaction products of aromatic polyhydroxy compounds and epichlorohydrin. Particularly diphenylol propane is much used as a polyhydroxy compound. (see FIG. 4).

Now it was found that hardening epoxy resins, having on the average at least two epoxy groups in their molecule, can be effected by reacting the epoxy compounds with α-halogenalkyl ethers which on the average have at least two α-halogenalkyl ether groups in the molecule. The reaction can considerably be accelerated by adding a small amount of a catalyst.

The preparation of α-halogenalkyl ethers is known in the art (see L. Summers Chem. Rev. 55, 2, page 301 (1955). A suitable method of preparation is the reaction of a mixture of an alcohol, an aldehyde and hydrogen halide under dehydration.

These α-chloro ethers are mostly liquids. They can be stored well at ambient temperatures and under dry conditions. The halogen atom is rather reactive as a result of which all types of substitution or addition reactions are possible.

The α-chloroalkyl ethers and especially (glycols) are prepared, for instance, by saturating a mixture of 1 mol of the glycol and 2 moles of an aldehyde such as formaldehyde with gaseous HCl at temperatures of 0°–20° C. In the course of time there arise two layers, an aqueous phase and an "ether" phase. The latter is separated and dried with, for instance, $CaCl_2$ whereafter by distillation the bis-(chloroalkyl) ethers can be obtained in pure form.

The equation of the reaction for ethylene glycol and formaldehyde is:

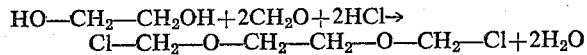

$$HO-CH_2-CH_2OH + 2CH_2O + 2HCl \rightarrow$$
$$Cl-CH_2-O-CH_2-CH_2-O-CH_2-Cl + 2H_2O$$

When this compound is called the $C_2$ ether, then in a similar way the homologous $C_3$, $C_4$, $C_5$ and higher ethers can be prepared from the corresponding diols. Other polyalcohols such as glycerol, trimethylolpropane, pentaerythritol, mannitol, sorbitol, di- and polyglycerol, di- and polyethylene glycol and the like can be used as starting materials.

Although formaldehyde is preferred because it is cheap other alipahic aldehydes may be used as well. But the higher α-chloroalkyl ethers must be handled with care.

In an addition reaction the α-chloroalkyl ethers react with epoxy groups. Usually this reaction proceeds very slowly but can be accelerated considerably by small amounts (e.g. 0.005%–1.0%) of a catalyst.

These catalysts may be halides of certain metals such as $HgCl_2$, $SnCl_4$, $FeCl_3$, $ZnCl_2$, $SbCl_3$, $BiCl_3$ etc. Also organometal compounds show a very good catalyst effect. They may for example be represented by the formula $R_xMeCl_y$ in which R is an organic group and Me is a metal atom and $(x+y)$ is the valency value of Me wherein $x$ is at least 1. Examples are $CH_3SnCl_3$, phenyl—$SnBr_3$ and the like. Some metal compounds which easily yield metal halides are catalytically active, too, for example metal oxides, metal sulphides, metal carbonates and metal alcoholates such as $ZnCO_3$, the acetates of zinc and iron, antimony sulphide, $SnO_2$, antimony ethylate. The metals should neither be inert metals nor alkali or earth alkali metals.

Also catalytically active are tertiary amines such as pyridine, dialkylanilines, N-methylmorpholine, N,N'-dialkyl piperizine and the like.

It is believed that the catalytic activity is related to the possibility of the catalyst to form complexes with the α-halogenalkyl ethers.

If one starts from polyfunctional α-chloromethyl ethers and polyfunctional epoxy compounds, then polymer compounds will be produced. The nature and the functionality of the reaction components are chiefly determinative for the properties of the end product especially with regard to their thermosetting or thermoplastic properties.

In the examples halogen is nearly always chlorine because chlorine compounds are cheaper than bromine compounds. But all reactions proceed with the equivalent amounts of bromine compounds as well.

EXAMPLE I

In order to measure the reaction rate, at 30° C. a test was carried out with as a model the mono-epoxy compound phenylglycidyl ether and the $C_2$ ether (see FIG. 1 of the formula sheet in which the phenyl group is indicated as R'''), with 0.02% of $HgCl_2$, degree of conversion of $C_2$ ether after 6 hours: abt. 50%
with 0.06% of $HgCl_2$, degree of conversion of $C_2$ ether after 2 hours: abt. 90%
with 0.08% of $HgCl_2$, degree of conversion of $C_2$ ether after 1 hour: abt. 95%.

According to the invention epoxy resins are used that on an average have at least two epoxy groups per molecule, these resins being subjected to a polymerization reaction with bis-(chloroalkyl) ethers and poly(chloroalkyl) ethers.

The catalyst concentration ought to be determined accurately in dependence on the total mass and the hardening temperature. Otherwise too extreme rises in temperature in the mass may occur by a too violent polymerization, since the reaction is strongly exothermic. Suitable concentrations can easily be found by test experiments.

The presence of a small quantity of OH groups in the epoxy resin may in some cases also be of value so as to attain a desired extent of cross-linking. Many of the epoxy resins that are in the market have such a content of OH groups to a suitable extent.

Figure 2:
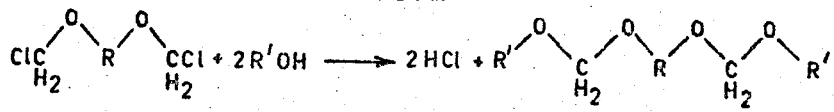

The α-chloromethyl ether compounds can also react with the OH groups while forming acetals and HCl (see FIG. 2, in which R and R' represent organic groups).

Figure 3:
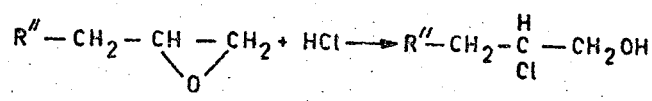

The HCl being released in equivalent to the OH groups present and is bound again by the epoxy resins while forming chlorohydrin groupings (see FIG. 3, in which R'' represents an aliphatic or an aromatic group).

EXAMPLE II

Figure 4:
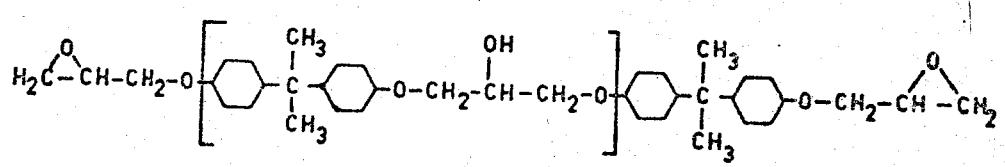

Starting from 1 mol of diphenylol propane and 10 mol of epichlorohydrin in the way known in the art a light-yellow coloured viscous resin was obtained with an epoxy equivalent of 191–192; molecular weight 340. This compound chiefly has a structure as indicated in FIG. 4.

75 grammes of this resin is mixed with 25 grammes of bischloromethyl ether from ethylene glycol. The 0.04% (i.e. abt. 0.04 gramme) of $HgCl_2$ is added and after mixing hardening occurs at 60°–70° C. within two hours. A somewhat rubbery insoluble material is produced, for example as a rod. It can be compressed under a press, whereafter in removing the pressure it returns entirely to the original rod-shape after some minutes. This phenomenon is strongly temperature-dependent.

From extraction tests of ground material it has been found that the binding of the $C_2$ ether to the epoxy resin is in a net-like structure. The extraction was carried out in a Soxhlet apparatus with boiling acetone for 3 hours.

Result: Cl-content of the material before extraction: 10.7%; Cl-content of the material after extraction: 10.5%.

A like starting resin with $C_2$ ether results in a quick hardening at ambient temperature after adding 0.04% of $SnCl_4$ as a catalyst.

The resin thus obtained on hardening adheres very strongly to all types of material, such as glass, wood, metal, plastics.

The hardened products obtained in general have a good resistance against acids, bases and various solvents, which appears from the following tests:

The material is divided into small pieces of abt. 2 cm.³ and boiled with the pertinent liquid for 4 hours, whereafter it is still treated further for 3 days at room temperature and then rinsed and dried. Measured is the change in weight after drying.

| Liquid: | Result |
| --- | --- |
| Methanol | 0.2% decrease. |
| Ethanol | No decrease. |
| Butanol | Do. |
| Water | Do. |
| 10% HCl | 0.2% decrease. |
| 10% $H_2SO_4$ | No decrease. |
| 10% NaOH | 0.5% decrease. |
| 20% KOH | Do. |

Hardened resins swell in acetone, butanone, toluene and benzene. Their resistance to heat is good: decrease in weight less than 2% at 200° C. for 3 hours.

The hardening reaction with the products according to the invention can be used for casting resins, laminating resins, elastic fillers, adhesives and bonding agents for paints and lacquers.

Hardening commercial epoxy resins

Araldite CY 185 (Ciba) condensation product of epichlorohydrin and Bisphenol A: epoxy equivalent 191.

Mixing ratio 75% by weight of resin and 25% by weight of $C_2$ ether.

The results are practically the same as with the abovementioned resin.

Araldite LY 556 condensation product of epichlorohydrin and Bisphenol A: epoxy equivalent 228. Ratio 78% of resin and 22% of $C_2$ ether.

At ambient temperature the hardened product is softer and more flexible than with the CY 185 resin.

The hardening of the above-mentioned resins with poly(chloromethyl) ether products, e.g. of pentaerythritol, yields a material with a harder and more rigid character than with the $C_2$ ethers. This is caused by the higher degree of cross-linking, connected with the higher functionality. The chemical resistance of these harder products is better than that of the more flexible products.

EXAMPLE III

The epoxy resin available under the commercial name of "Araldite CY 185" is mixed with an equivalent amount of α-chloromethyl ether of pentaerythritol. This compound is tetrafunctional $C(-CH_2-OCH_2Cl)_4$. After adding 0.02% of $SnCl_4$ the mixture hardens after some hours at 40° C. into a strong hard substance. This produce is less swellable in acetone or benzene than the end product of $C_2$ ether with the same epoxy resin. The compressive strength amounts to abt. 1100 kg./cm.².

EXAMPLE IV

Figure 5:
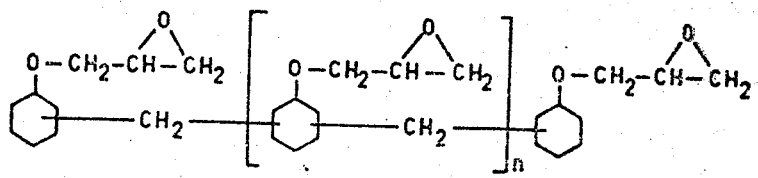

From a phenol novolak an epoxy resin is prepared in the way known in the art by reacting the novolak with epichlorohydrin in a strong lye. The formula of the epoxy resin obtained substantially corresponds to that of FIG. 5 of the formula sheet annexed. This polyfunctional epoxy resin yields, after mixing with an equivalent amount of $C_2$ ether and the addition of 0.01% of $HgCl_2$ (dissolved in a small amount of the $C_2$ ether) a harder end product than with the bisphenol epoxy resins mentioned before.

EXAMPLE V 16 grammes of epoxy resin available under the commercial name of Araldite LY 556 resin and 5.3 grammes of $C_2$ ether are mixed. Previously, to this $C_2$ ether 21 mgrammes of butyltin trichloride is added as a catalyst. The mixture geleates in about 10 minutes. The reaction is strongly exothermic, after abt. 15 minutes a maximum temperature of 138° C. is measured, the mass being hardened for the greater part already into a homogeneous, clear, infusible and strong product.

EXAMPLE VI

Figure 6:
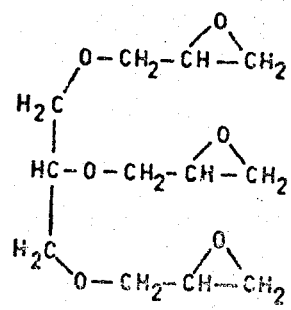

An aliphatic poly-epoxy compound can also be hardened with the hardeners according to the invention. From glycerine and epichlorohydrin the corresponding trifunctional epoxy compound according to FIG. 6 of the formula sheet is prepared.

Hardening this tri-epoxy compound with an equivalent amount of $C_2$ ether and 0.02% of $HgCl_2$ yields at 50° C. an insoluble, elastic material, which is swellable in polar solvents.

EXAMPLE VII 31.2 grammes of a liquid epoxy resin Epikote 828 (Shell) with an epoxy equivalent of 190 and an OH-equivalent of 0.056/100 grammes are mixed with 8.8 grammes of the tri(chloromethyl) ether of glycerol; boiling point 136–138° C./0.7 mm. Hg, $n_D^{24} = 1.4830$; chlorine equivalent 80.0. In this mixture 0.064 grammes of $SbCl_3$ are dissolved.

Within about 50 minutes the temperature rises from room temperature to 62–63° C. Then gelation occurs. After 24 hours standing at room temperature a hard, clear, light-yellow thermosetting product is obtained.

This mixture of 78% by weight of Epikote 828 and 22% by weight of hardener can be cast between plates of glass or metal; after 3 hours at about 50° C. it is hardened.

From the plates thus obtained test rods are made and the mechanical properties are measured

| | |
|---|---|
| Tensile strength _____kg./cm.² | 780 |
| Modulus _____kg./cm.² | 36,700 |
| Elongation _____percent | 4.5 |
| Flexural strength _____kg./cm.² | 1121 |
| H.D.T. _____° C | 52–53 |
| Chlorine: | |
|   Found _____percent | 10.0 |
|   Calculated _____do | 9.8 |
|   Found (after boiling for 5 hours in NaOH 20%) _____percent | 9.7 |

EXAMPLE VIII

A mixture of two epoxy resins (Epikote 828 and Rutag 0300) is prepared in a ratio 1:1.

Rutag 0300 is an epoxylated novolak with an epoxy equivalent 175–185.

To 46.8 grammes of this mixture under agitation 13.2 grammes of tri(chloromethyl) ether of glycerol in which 0.05 grammes of $SbCl_3$ are dissolved, are added. The amount of $SbCl_3$ catalyst calculated on the total weight is about 0.08%.

Within 75 minutes the temperature of the mixture rises from 25° C. to 75° C. whereupon gelation occurs. Then the product is cooled to room temperature. After 24 hours a hard, yellow product is obtained.

| | |
|---|---|
| Flexural strength _____kg./cm.² | 1250 |
| Modulus _____kg./cm.² | 32,300 |
| H.D.T. _____° C | About 80 |

EXAMPLE IX 88 grammes of Epikote 828 resin are mixed with 22 grammes of tri(chloromethyl) ether of glycerol. As a catalyst 1 g. of pyridine is added. Within 30 minutes the temperature rises to 75° C. and after 1–2 hours a hard, yellow resin is obtained.

EXAMPLE X

An organo antimony compound is prepared by mixing an equivalent amount of $SbCl_3$ with an equivalent amount of phenylglycidyl ether.

The formula of the product is

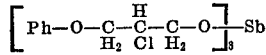

in which Ph represents the phenyl radical.

A solution of 10% of this compound in phenylglycidyl ether is prepared.

Of this solution 1.0 gramme is mixed with 46.8 grammes of Epikote 828 and 13.2 grammes of tri(chloromethyl) ether of glycerol. After 1 hour the temperature has risen to 117° C. After cooling a hard, yellow product is obtained.

EXAMPLE XI

From 1,2,5 - trihydroxypentane, $CH_2O$ and HCl the tri(chloromethyl) ether is prepared. Boiling point 155–159° C./1.6 mm. Hg; $n_D^{24} = 1.4819$; chlorine equivalent is 93.0.

Of this ether 13.2 grammes are mixed with 46.8 grammes of Epikote 828 and 0.10 gramme of $SbCl_3$. After two hours the mixture is hard; the hardening process is exothermic; the temperature rises during hardening to 70–80° C.

EXAMPLE XII

Gaseous HBr is led through a mixture of ethylene glycol and paraform $(CH_2O)_3$. The bis(bromomethyl) ether of glycol is formed. Boiling point 97–100° C./2 mm. Hg; $n_D^{20} = 1.5254$; bromine equivalent is 125 (calculated: 125).

70 parts of Epikote 828 are mixed with 30 parts of this ether together with 0.01% of $SbCl_3$. After some minutes an exothermic reaction starts and within about 15 minutes gelation and hardening are completed. The resin thus obtained is rather strong and somewhat elastic.

As a result of the rather high bromine content of about 20% this resin is self-extinguishing.

In general the bromo ether is more reactive than the corresponding chlorine ether.

The amount of catalyst lies preferably in the range of 0.005 to 1.0% by weight calculated on the total mixture.

We claim:

1. A method for the polymerization of polyfunctional epoxy compounds comprising polymerizing in the presence of a catalyst selected from the group consisting of (a) tertiary amines, (b) halides of mercury, tin, iron, zinc and antimony and (c) methyl tin trichloride and butyl tin trichloride, an epoxy compound having at least 1,2 epoxy groups with an halogen alkyl ether of an aliphatic polyhydroxy compound having on an average at least two α-halogenalkyl ether groups.

2. A method according to claim 1 wherein an epoxy resin is mixed with an almost equivalent amount of a compound that on an average contains at least two α-chloromethyl ether groups and then is mixed with 0.005–1.0 percentages by weight of the composition of a halide of a metal selected from the group consisting of mercury, tin, iron, zinc and antimony dissolved in the rest of the equivalent amount of α-halogen ether compound.

3. A method according to claim 1, wherein 0.005% to 1.0% by weight of a metal halide catalyst selected from the group consisting of $HgCl_2$, $SnCl_4$, $FeCl_3$, $ZnCl_2$, $SbCl_3$, and $BiCl_3$ is added.

4. A method according to claim 3, wherein 0.01% to 0.2% of $HgCl_2$ is added as a catalyst.

5. A method according to claim 3, wherein 0.01% to 0.2% of $SnCl_4$ is added as a catalyst.

6. A method according to claim 3, wherein 0.01% to 0.2% of $SbCl_3$ is added as a catalyst.

7. A method according to claim 1, wherein a tertiary amine is added as a catalyst.

8. A method according to claim 7, wherein pyridine is added as a catalyst.

9. A method according to claim 1 wherein 0.01%–0.5% of butyltin trichloride ($C_4H_9SnCl_3$) is added as a catalyst.

10. A method according to claim 7, wherein the tertiary amine catalyst is selected from the group consisting of pyridine, dialkylaniline, N-methylmorpholine, and N,N'-dialkyl piperazine.

11. A method according to claim 1, wherein the epoxy compound having at least two epoxy groups is the reaction product of an aromatic polyhydroxy compound with epichlorohydrin.

12. The polymerized product produced by the process of claim 1 using 0.005 to 1.0% by weight of a catalyst selected from the group consisting of a tertiary amine, $HgCl_2$, $SnCl_4$, $FeCl_3$, $ZnCl_2$, $SbCl_3$ and $BiCl_3$.

References Cited

Handbook of Epoxy Resins, by Lee and Neville, 1967 (pp. 22–10 to 22–16).

WILLIAM H. SHORT, Primary Examiner

T. E. PERTILLA, Assistant Examiner

U.S. Cl. X.R.

117—124 E, 127, 138.8 A, 148; 260—2 EC, 2 EP, 47 EP, 59, 830 TW